US 11,421,082 B2

United States Patent
Nowak et al.

(10) Patent No.: US 11,421,082 B2
(45) Date of Patent: Aug. 23, 2022

(54) BROADBAND-TRANSPARENT POLYSULFIDE-BASED COPOLYMERS

(71) Applicant: HRL Laboratories, LLC, Malibu, CA (US)

(72) Inventors: Andrew P. Nowak, Los Angeles, CA (US); Ashley M. Dustin, Los Angeles, CA (US); April R. Rodriguez, Santa Monica, CA (US); Kevin Drummey, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 289 days.

(21) Appl. No.: 16/717,466

(22) Filed: Dec. 17, 2019

(65) Prior Publication Data

US 2020/0291185 A1 Sep. 17, 2020

Related U.S. Application Data

(60) Provisional application No. 62/817,690, filed on Mar. 13, 2019.

(51) Int. Cl.
*C08G 75/16* (2006.01)
(52) U.S. Cl.
CPC .................. *C08G 75/16* (2013.01)
(58) Field of Classification Search
CPC ........ C09J 181/02; C08G 75/12; C08G 75/16; C08G 75/04; C08G 75/02; C08G 75/00;
(Continued)

(56) References Cited

U.S. PATENT DOCUMENTS

| | | |
|---|---|---|
| 3,290,413 A | 12/1966 | Fettes |
| 5,929,202 A | 7/1999 | Arita et al. |
| 7,872,093 B2 | 1/2011 | Kousaka |
| 9,306,218 B2 | 4/2016 | Pyun et al. |
| 9,567,439 B1 | 2/2017 | Pyun et al. |

(Continued)

FOREIGN PATENT DOCUMENTS

WO 2017011533 A1 1/2017

OTHER PUBLICATIONS

Griebel et al., "Kilogram Scale Inverse Vulcanization of Elemental Sulfur to Prepare High Capacity Polymer Electrodes for Li—S Batteries" Journal of Polymer Science, Part A: Polymer Chemistry 2015, 53, 173-177.
(Continued)

*Primary Examiner* — Shane Fang
(74) *Attorney, Agent, or Firm* — O'Connor & Company; Ryan P. O'Connor

(57) ABSTRACT

Some variations provide a polysulfide-based copolymer containing first repeat units comprising $S_8$-derived sulfur atoms bonded via sulfur-sulfur bonds; and second repeat units comprising an organic, non-aromatic thiol molecule. Other variations provide a polysulfide-based copolymer containing first repeat units comprising $S_8$-derived sulfur atoms bonded via sulfur-sulfur bonds; and second repeat units comprising an organic, non-aromatic unsaturated molecule, wherein the polysulfide-based copolymer has a total sulfur concentration of about 10 wt % or greater. Other variations provide a polysulfide-based copolymer containing first repeat units comprising $S_8$-derived sulfur atoms bonded via sulfur-sulfur bonds; second repeat units comprising an organic, non-aromatic thiol molecule; and third repeat units comprising an organic, non-aromatic unsaturated molecule. Other variations provide a polysulfide-based copolymer containing first repeat units comprising $S_8$-derived sulfur atoms bonded via sulfur-sulfur bonds; and second repeat units comprising an organic, non-aromatic thioether mol-
(Continued)

(a)      (b)      (c)      (d)

ecule. The disclosed polysulfide-based copolymers provide broadband transparency, fracture toughness, fluid resistance, and low cost.

29 Claims, 2 Drawing Sheets

(58) Field of Classification Search
CPC ..... C08G 18/04; C07C 321/18; C07C 321/14; C08L 81/02; C08L 81/00; B05D 3/02; C08F 8/34; B64D 45/02
See application file for complete search history.

(56) References Cited

U.S. PATENT DOCUMENTS

| | | | |
|---|---|---|---|
| 10,000,380 B2 | 6/2018 | Barnicki et al. | |
| 2010/0073847 A1* | 3/2010 | Martin | C08G 65/3346 528/367 |
| 2012/0073027 A1* | 3/2012 | Martin | C08G 65/3348 549/72 |
| 2016/0086685 A1* | 3/2016 | Mallires | C25B 3/00 252/500 |
| 2018/0208686 A1 | 7/2018 | Pyun et al. | |

OTHER PUBLICATIONS

Griebel et al., "Polymerizations with elemental sulfur: A novel route to high sulfur content polymers for sustainability, energy and defense" Progress in Polymer Science, vol. 58, Jul. 2016, abstract.

Chung et al., "The use of elemental sulfur as an alternative feedstock for polymeric materials" Nature Chemistry, vol. 5, Jun. 2013, pp. 518-524.

Boyd et al., "Optical Properties of a Sulfur-Rich Organically Modified Chalcogenide Polymer Synthesized via Inverse Vulcanization and Containing an Organometallic Comonomer" ACS Macro Lett. 2019, 8, 113-116.

Bartlett et al., "Reactions of Elemental Sulfur. I. The Uncatalyzed Reaction of Sulfur with Triarylphosphines" J. Am. Chem. Soc. 1956, 78, 15, 3710-3715.

Griebel et al., "Dynamic Covalent Polymers via Inverse Vulcanization of Elemental Sulfur for Healable Infrared Optical Materials" ACS Macro Lett. 2015, 4, 862-866.

Kleine et al., "High Refractive Index Copolymers with Improved Thermomechanical Properties via the Inverse Vulcanization of Sulfur and 1,3,5-Triisopropenylbenzene" ACS Macro Lett. 2016, 5, 1152-1156.

Bordoloi et al., "Plastic Sulfur Stabilization by Copolymerization of Sulfur with Dicyclopentadiene" New Uses of Sulfur—II Advances in Chemistry; vol. 165, pp. 31-53, American Chemical Society, 1978.

Griebel et al., "Polymerizations with elemental sulfur: A novel route to high sulfur content polymers for sustainability, energy and defense" Progress in Polymer Science, vol. 58, Jul. 2016.

PCT/US2019/067026 International Search Report, dated Apr. 24, 2020.

PCT/US2019/067026 Written Opinion of International Search Authority, dated Apr. 24, 2020.

* cited by examiner (a)

(b)

(c)

(d)

(a)

(b)

(c)

(d)

(e)

BROADBAND-TRANSPARENT POLYSULFIDE-BASED COPOLYMERS

PRIORITY DATA

This patent application is a non-provisional application claiming priority to U.S. Provisional Patent App. Ser. No. 62/817,690, filed on Mar. 13, 2019, which is hereby incorporated by reference herein.

FIELD OF THE INVENTION

The present invention generally relates to transparent, sulfur-containing polymers.

BACKGROUND OF THE INVENTION

Broadband-transparent materials are materials that are transparent over a broad electromagnetic band including at least two of ultraviolet (UV), visible (Vis), and infrared (IR). Broadband-transparent materials may be used in a variety of applications, such as coatings, windows, and lenses.

Combining visual transparency and IR transparency in a single material is challenging due to requirements such as a high degree of homogeneity, a low variation in index of refraction throughout the material, and a lack of elements that absorb across the visual spectrum and the IR spectrum. Many IR-transparent materials are classified as semiconductors and possess band gaps in excess of the energies of IR light. However, most of these band gaps are not sufficiently large to pass visible light, thus rendering the IR-transparent materials visually opaque. The few materials that are transparent across both Vis and IR spectrums are difficult or impossible to fashion into lenses or windows. Additionally, these materials suffer the drawback of typically being rigid, brittle, and prone to breakage. Typical materials with good UV transmission (such as quartz) or good IR transmission (such as inorganic semiconductors) tend to be hard, brittle materials that are difficult and expensive to process and shape. IR-transparent windows and lenses have significant commercial value but their cost and fragility have been a drawback.

Industrial materials are often exposed to the environment and intense UV radiation. Durability to extended exposure in these environments is critical. However, common UV stabilizers are typically highly absorptive in the IR, thus rendering their addition unacceptable when an IR-transparent material is desired. When the IR-transparent material is also UV-transparent, UV absorption and consequent degradation is reduced or avoided.

There are potential advantages to broadband-transparent materials in the form of broadband-transparent polymers. In particular, polymers have the potential to provide good toughness, durability, and cost. However, transparent polymeric materials tend to be limited in the wavelength ranges they can pass. For example, polycarbonate and poly(methyl methacrylate) are Vis-transparent but IR-opaque. Polyethylene is IR-transparent but Vis-opaque. Broadband transparency, particularly in the UV and mid-wave to long-wave IR spectrum, is an uncommon feature of polymeric materials. Polymer crystallinity and inhomogeneity at the micrometer scale scatters light, thereby limiting visual transmission and image quality across the Vis-IR spectrum. In addition, the softness of the polymer produces poor abrasion resistance and limits durability in aggressive environments. Cyclic olefin copolymers are another class of polymers with impressive visual transmission and good near IR transmission. However, their thermoplastic and nonpolar character renders them susceptible to a variety of fluids such as fuels and oils common in industrial applications.

A combination of the toughness and durability of typical engineering plastics (such as polycarbonate) with broadband transmission properties is a longstanding trade in the materials space and is a serious problem in the areas of IR detectors and lenses, for example. An improvement upon the heretofore known structures would be the formation of a curable network over convenient times and temperatures, creating a crosslinked structure that is transparent across a wide wavelength range and is robust against temperature and fluid exposure.

Elemental sulfur is known to vulcanize polymeric hydrocarbon species, such as polybutadiene in the production of tire rubber. Vulcanized rubber incorporates a low level of sulfur (e.g., 3 wt %) with hydrocarbon precursors, principally polybutadiene polymers or oligomers, along with a number of fillers or functional additives (carbon black, silica, catalysts, etc.).

Sulfur is also known as a vulcanization agent for small unsaturated molecules (e.g., 1,3-diisopropenylbenzene) to produce sulfur electrodes. Typically, a very high (>50 wt %) concentration of sulfur is reacted with unsaturated vinyl groups, leading to weak mechanical properties. In particular, the sulfur and unsaturated molecules may be heated together and cured into crosslinked networks, but due to the poor mechanical properties of sulfur-rich polymer composites, the products are unacceptable for applications that require even modest environmental durability or resistance to fracture.

Based on the limitations in the current state of the art, there is a commercial need for a material with broadband transparency, fracture toughness, fluid resistance, and low cost. Some specific applications of broadband-transparent polymers are durable, transparent protective coatings for automotive integrated light detection and ranging (LIDAR); optics for UV sources; quartz window alternatives for intense UV sanitation; and low-cost, increased-durability materials (windows and lenses) for IR vision systems. Additional commercial opportunities exist in the area of 3D printing, see-through inspection panels, low-emissivity coatings, and compound lens stacks, for example.

SUMMARY OF THE INVENTION

The present invention addresses the aforementioned needs in the art, as will now be summarized and then further described in detail below.

Some variations of the invention provide a polysulfide-based copolymer containing (a) a plurality of first repeat units each comprising at least two sulfur atoms bonded together via a sulfur-sulfur bond, wherein the sulfur atoms are derived from cyclo-octasulfur; and (b) a plurality of second repeat units each comprising at least one reactive species containing an organic, non-aromatic thiol molecule with a degree of thiol functionality.

In some embodiments, the degree of thiol functionality is selected from 1 to 5, such as from 2 to 5. The organic, non-aromatic thiol molecule may be linear, cyclic, or branched.

The organic, non-aromatic thiol molecule may be selected from the group consisting of 1,2,4-tris(2-mercaptoethyl) cyclohexane, cyclopentanethiol, cyclohexanethiol, thiol-containing polyphosphazene, and combinations thereof.

In some embodiments, the organic, non-aromatic thiol molecule has a molecular weight of less than 5000 g/mol, such as about, or less than about, 4000 g/mol, 3000 g/mol, 2000 g/mol, 1500 g/mol, or 1000 g/mol.

In some embodiments, the polysulfide-based copolymer further contains from about 1 ppm to about 1 wt % of an organometallic catalyst. The organometallic catalyst may contain a metal selected from the group consisting of tin, zinc, nickel, copper, sodium, silicon, and combinations thereof. For example, the organometallic catalyst may be selected from the group consisting of tetravinyl tin, tetraallyl tin, tetravinyl silane, tetraallyl silane, tributyl vinyl tin, allyltributyl tin, tetrabutyl tin, tetramethyl tin, tetraethyl tin, dibutyl tin dilaurate, zinc diethyldithiocarbamate, nickel diethyldithiocarbamate, copper diethyldithiocarbamate, sodium diethyldithiocarbamate trihydrate, zinc stearate, and combinations thereof.

In some embodiments, the polysulfide-based copolymer is characterized by at least 50% average, regular transmission of radiation at a wavelength selected from 100 nm to 12 μm, wherein the average, regular transmission is defined as the ratio (expressed as a percentage) of radiation intensity through a polysulfide-based copolymer thickness of 25 microns divided by incident radiation intensity.

Other variations of the invention provide a polysulfide-based copolymer containing (a) a plurality of first repeat units each comprising at least two sulfur atoms bonded together via a sulfur-sulfur bond, wherein the sulfur atoms are derived from cyclo-octasulfur; and (b) a plurality of second repeat units each comprising at least one reactive species containing an organic, non-aromatic unsaturated molecule with a degree of unsaturation functionality, wherein the polysulfide-based copolymer has a total sulfur concentration of about 10 wt % or greater.

In some embodiments, the degree of unsaturation functionality is selected from 1 to 5. The organic, non-aromatic unsaturated molecule may be linear, cyclic, or branched.

In some embodiments, the organic, non-aromatic unsaturated molecule is selected from the group consisting of 1,2,4-trivinylcyclohexane, norbornene, vinyl norbornene, dicyclopentadiene, α,ω-alkene-terminated hydrocarbons, α,ω-alkyne-terminated hydrocarbons, and combinations thereof.

In some embodiments, the organic, non-aromatic unsaturated molecule has a molecular weight of less than 5000 g/mol, such as about, or less than about, 4000 g/mol, 3000 g/mol, 2000 g/mol, 1500 g/mol, or 1000 g/mol.

Optionally, the polysulfide-based copolymer further contains an organic, non-aromatic thiol molecule with a degree of thiol functionality (e.g., from 2 to 5). The thiol molecule may be contained in the same repeat units as the unsaturated molecule, or in different repeat units.

The polysulfide-based copolymer may further contain from about 1 ppm to about 1 wt % of an organometallic catalyst. The organometallic catalyst may contain a metal selected from the group consisting of tin, zinc, nickel, copper, sodium, silicon, and combinations thereof. For example, the organometallic catalyst may be selected from the group consisting of tetravinyl tin, tetraallyl tin, tetravinyl silane, tetraallyl silane, tributyl vinyl tin, allyltributyl tin, tetrabutyl tin, tetramethyl tin, tetraethyl tin, dibutyl tin dilaurate, zinc diethyldithiocarbamate, nickel diethyldithiocarbamate, copper diethyldithiocarbamate, sodium diethyldithiocarbamate trihydrate, zinc stearate, and combinations thereof.

The polysulfide-based copolymer (with unsaturated molecules) may be characterized by at least 50% average, regular transmission of radiation at a wavelength selected from 100 nm to 12 μm, wherein the average, regular transmission is defined as the ratio (expressed as a percentage) of radiation intensity through a polysulfide-based copolymer thickness of 25 microns divided by incident radiation intensity.

Still other variations of the invention provide a polysulfide-based copolymer containing (a) a plurality of first repeat units each comprising at least two sulfur atoms bonded together via a sulfur-sulfur bond, wherein the sulfur atoms are derived from cyclo-octasulfur; (b) a plurality of second repeat units each comprising at least one reactive species containing an organic, non-aromatic thiol molecule with a degree of thiol functionality; and (c) a plurality of third repeat units each comprising at least one reactive species containing an organic, non-aromatic unsaturated molecule with a degree of unsaturation functionality.

In some embodiments, the organic, non-aromatic thiol molecule has a molecular weight of less than 5000 g/mol, and the organic, non-aromatic unsaturated molecule also has a molecular weight of less than 5000 g/mol.

In some embodiments, the degree of thiol functionality is selected from 1 to 5 (e.g., from 2 to 5), and the degree of unsaturation functionality is also (independently) selected from 1 to 5.

The polysulfide-based copolymer has a total sulfur concentration of about 10 wt % or greater, in certain embodiments.

In the polysulfide-based copolymer with both thiol and ene units, the organic, non-aromatic thiol molecule may be selected from the group consisting of 1,2,4-tris(2-mercaptoethyl)cyclohexane, cyclopentanethiol, cyclohexanethiol, thiol-containing polyphosphazene, and combinations thereof; and the organic, non-aromatic unsaturated molecule may be selected from the group consisting of 1,2,4-trivinylcyclohexane, norbornene, vinyl norbornene, dicyclopentadiene, α,ω-alkene-terminated hydrocarbons, α,ω-alkyne-terminated hydrocarbons, and combinations thereof.

In some embodiments, the polysulfide-based copolymer further contains from about 1 ppm to about 1 wt % of an organometallic catalyst that contains a metal selected from the group consisting of tin, zinc, nickel, copper, sodium, silicon, and combinations thereof. For example, the organometallic catalyst may be selected from the group consisting of tetravinyl tin, tetraallyl tin, tetravinyl silane, tetraallyl silane, tributyl vinyl tin, allyltributyl tin, tetrabutyl tin, tetramethyl tin, tetraethyl tin, dibutyl tin dilaurate, zinc diethyldithiocarbamate, nickel diethyldithiocarbamate, copper diethyldithiocarbamate, sodium diethyldithiocarbamate trihydrate, zinc stearate, and combinations thereof.

The polysulfide-based copolymer (with both thiol molecules and unsaturated molecules) may be characterized by at least 50% average, regular transmission of radiation at a wavelength selected from 100 nm to 12 μm, wherein the average, regular transmission is defined as the ratio (expressed as a percentage) of radiation intensity through a polysulfide-based copolymer thickness of 25 microns divided by incident radiation intensity.

Yet other variations of the invention provide a polysulfide-based copolymer containing (a) a plurality of first repeat units each comprising at least two sulfur atoms bonded together via a sulfur-sulfur bond, wherein the sulfur atoms are derived from cyclo-octasulfur; and (b) a plurality of second repeat units each comprising at least one reactive species containing an organic, non-aromatic thioether molecule.

In some embodiments, the organic, non-aromatic thioether molecule has a molecular weight of less than 5000 g/mol, such as about, or less than about, 4000 g/mol, 3000 g/mol, 2000 g/mol, 1500 g/mol, or 1000 g/mol. The organic, non-aromatic thioether molecule may be derived from a reaction between an organic, non-aromatic thiol molecule and an organic, non-aromatic unsaturated molecule. In the final copolymer, there may be thioether molecules; a number of sulfur species containing 2, 3, 4, 5, 6, or 7 sulfur atoms that are bonded to each other in sulfur-sulfur bonds (—S—S—); thiol molecules; and unsaturated molecules all present.

In some embodiments, the polysulfide-based copolymer further contains from about 1 ppm to about 1 wt % of an organometallic catalyst that contains a metal selected from the group consisting of tin, zinc, nickel, copper, sodium, silicon, and combinations thereof. The organometallic catalyst may be selected from the group consisting of tetravinyl tin, tetraallyl tin, tetravinyl silane, tetraallyl silane, tributyl vinyl tin, allyltributyl tin, tetrabutyl tin, tetramethyl tin, tetraethyl tin, dibutyl tin dilaurate, zinc diethyldithiocarbamate, nickel diethyldithiocarbamate, copper diethyldithiocarbamate, sodium diethyldithiocarbamate trihydrate, zinc stearate, and combinations thereof.

In some embodiments, the polysulfide-based copolymer (containing thioether molecules) is characterized by at least 50% average, regular transmission of radiation at a wavelength selected from 100 nm to 12 μm, wherein the average, regular transmission is defined as the ratio (expressed as a percentage) of radiation intensity through a polysulfide-based copolymer thickness of 25 microns divided by incident radiation intensity.

DETAILED DESCRIPTION OF EMBODIMENTS OF THE INVENTION

Figure 1:
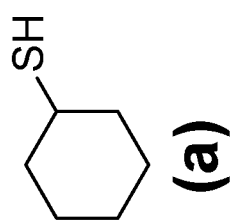
FIG. 1 depicts exemplary chemical structures for organic, non-aromatic thiol molecules that may be employed, in some embodiments; structure (a) is cyclohexanethiol, structure (b) is cyclopentanethiol, structure (c) is 1,2,4-tris(2-mercaptoethyl)cyclohexane, and structure (d) is poly(dithiophosphazene), n=1-100.
Figure 1:
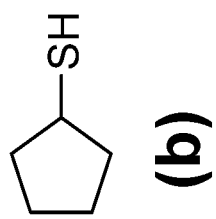
Figure 1:
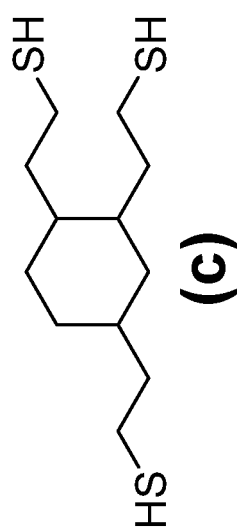
Figure 1:
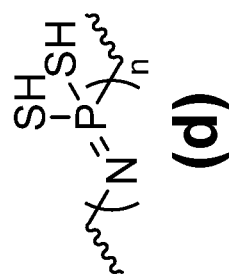

The principles, materials, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

The present disclosure provides polymeric materials that are transparent over a broad electromagnetic band including at least two of the ultraviolet (UV) spectrum, the visible (Vis) spectrum, and the infrared (IR) spectrum, and preferably all three of these spectrums. Materials that are transparent over UV, Vis, and IR spectrums are referred to herein as "broadband-transparent" materials, such as broadband-transparent polysulfide-based copolymers as disclosed herein.

In this disclosure a "polymer" means a large molecule, or macromolecule, composed of at least two repeat units. The number of repeat units may be in principle any number greater than 2, but typically is limited to about 10,000. In various embodiments, the number of repeat units (also known as the degree of polymerization) is 2, 3, 4, 5, about 10, about 50, about 100, about 200, about 500, about 1,000, about 2,000, or about 5,000. All references herein to "molecular weight" are in reference to weight-average molecular weight. The polymer may be linear, branched, cyclic, crosslinked, or a combination thereof. The polymer is typically a solid but can also be a liquid, depending on molecular weight, degree of crosslinking, and external conditions such as temperature. A "crosslink" is a bond that links one polymer chain to another. The crosslinking bonds may be covalent bonds, ionic bonds, or a combination thereof.

The UV spectrum corresponds to electromagnetic wavelengths from about 10 nanometers to about 400 nanometers. The Vis spectrum is the portion of the electromagnetic spectrum that is visible to the human eye, i.e. visible light, which is from about 400 nanometers to about 750 nanometers. The IR spectrum corresponds to electromagnetic wavelengths from about 750 nanometers to about 1 millimeter. For broadband-transparent materials, the near-IR spectrum from about 750 nanometers to about 2.5 microns, and mid-IR spectrum from about 2.5 microns to about 50 microns, are usually most relevant.

The mid-IR spectrum may be further classified into medium-wave infrared (MWIR) and long-wave infrared (LWIR). In this disclosure, the MWIR band refers to infrared light wavelengths from 3.1 μm to 5 μm, corresponding to infrared light wavenumbers (the number of waves per unit distance) from about 3200 $cm^{-1}$ to about 2000 $cm^{-1}$, respectively. The LWIR band refers to infrared light wavelengths from 8.1 μm to 12 μm, corresponding to infrared light wavenumbers from about 1200 $cm^{-1}$ to about 800 $cm^{-1}$, respectively. LWIR waves have less energy and therefore lower frequency, giving longer wavelengths and smaller wavenumbers. The wavenumber times the speed of light is the wave frequency.

In some embodiments, the disclosed polymeric materials are specifically IR-transparent, and more specifically, transparent in the near-IR spectrum. In some embodiments, the polymeric materials are specifically transparent at one or more wavelengths selected from 100 nm to 12 μm.

By "transparent" it is not necessarily meant completely transparent; some absorption of radiation may occur. In particular, "transparent" means a sheet of copolymer with known thickness (such as 25 microns) absorbs less than 50%, preferably about 40% or less, more preferably about 30% or less, and most preferably about 20% or less, of incident light at a wavelength of interest. If a wavelength range is used, the transmission is averaged over that range. Incident light is normal (perpendicular) to the surface of the copolymer sheet.

Regular transmission of light at a selected wavelength can be determined for a sample 25 microns (about 0.001 inch) thick, or for another thickness of interest, as $I(t)/I_0$, where $I_0$ is the incident intensity and $I(t)$ is the intensity as a function of thickness. $I(t)/I_0$ at a given panel thickness can be experimentally determined, for example, using a Perkin Elmer UV-Vis-IR spectrometer. It is noted that one of ordinary skill in the art will understand that transmission generally can include regular transmission and diffuse transmission, both of which can contribute to total transmission. The average transmission values in this specification include only regular transmission. Note also that the average transmission is an average over a range of wavelengths and may be calculated, for example, as the average value of the transmission in 0.1 micron increments of wavelength, or another increment of wavelength within the selected range of wavelengths.

This invention, in some variations, is predicated on the combination of elemental sulfur with thiols and/or with unsaturated molecules, to form sulfur-crosslinked copolymer networks that are characterized by limited broadband absorption as well as good mechanical toughness and durability. The combination of polymer toughness and broadband transparency is uncommon. The crosslinkable polymers described herein have the ability to be heat-cured into a variety of complex shapes with good transparency.

Chemical species within organic content or ligands frequently contain atoms and bonds that absorb in the near-to-mid IR at wavelengths of 0.75-12 μm. As a result, the number of acceptable bonds capable of producing transparent structures is limited. One noteworthy structure is polyethylene with only C—C and C—H bonds. However, polyethylene is soft and abrasion-prone and is not capable of being polymerized or cured under convenient conditions. Similarly, cyclic olefin copolymers are hydrocarbon polymers with excellent Vis and near-IR transparency; however, due to their thermoplastic nature, cyclic olefin copolymers have poor fluid resistance to non-polar fluids and also soften with heat.

Thermoset polymers are capable of resisting (a) chemical attack associated with exposure to fluids and (b) thermal degradation. Thermoset polymers require a curable network of monomers or oligomers. In order to produce a curable network, monomeric or oligomeric precursors need to contain reactive functional groups. Typical products of reactive-group chemistry, such as urethanes, epoxies, and acrylates, are highly absorptive in the IR spectrum. Thiol-ene reactions, on the other hand, generate thioethers from a reaction of a thiol with an unsaturated (carbon-carbon double bond) vinyl group. Thioethers are attractive because the relatively high mass of the sulfur atom shifts IR absorption to longer IR wavelengths (>12 μm).

Thiol-ene reactions are typically initiated by radical species. However, these initiating species commonly possess strong IR-absorbing groups and are trapped in the polymerized network upon curing. The present inventors have discovered that IR absorption can be avoided by incorporating elemental sulfur as an initiating species. Elemental sulfur at room temperature is typically in an eight-membered ($S_8$) ring structure, systematically named cyclo-octasulfur or equivalently octathiocane. Upon heating, cyclo-octasulfur is believed to ring-open to form reactive sulfur as free radicals and/or as ionic sulfur species. The ring-opened sulfur can initiate and couple to unsaturated groups as well as promote the reaction between discrete thiol and vinyl species, to form a cured network.

Monomeric species capable of making up an IR-transparent network are limited in number due to the strong absorption properties of the majority of bonds making up species containing carbon, oxygen, and hydrogen. If C—H bonds, and their absorption at 3-4 μm, are incorporated, then polymeric networks that are transparent in the NIR sub-ranges of 0.8-3 μm, 4-5 μm, and 8-12 μm are possible by limiting constituent atoms to carbon, sulfur, and hydrogen. Unsaturated carbon-carbon bonds (alkenes, C═C; or alkynes, C≡C) are undesirable from the point of view of IR absorption. However, in some embodiments, carbon-carbon bonds are preferable in precursor materials as reactive groups to react with thiol compounds, forming thioether bonds. Thioether bonds tend to absorb at longer wavelengths due to the increased mass of the sulfur atom compared to carbon, nitrogen, and oxygen.

In order to form a highly crosslinked thermoset network, multifunctional thiol and/or vinyl monomers are preferred. A "multifunctional" thiol monomer is a monomer with at least 2 thiol (—SH) groups present. A "multifunctional" vinyl monomer is a monomer with at least 2 carbon-carbon double bonds present.

There is a limited, but known, library of multifunctional reactive species that have n≥2 thiol or vinyl reactive species and contain only saturated hydrocarbon character in their interior between the reactive groups. In addition, the temperature at which these networks cure is important and directly affects their practicality. It has been found that selection of multifunctional reactive species that have n≥2 lowers the temperature required for solid curing (e.g., 120° C.). The incorporation of organometallic catalysts can further lower the curing temperature (e.g., to 100° C.).

Some variations of the invention provide a polysulfide-based copolymer containing (a) a plurality of first repeat units each comprising at least two sulfur atoms bonded together via a sulfur-sulfur bond, wherein the sulfur atoms are derived from cyclo-octasulfur; and (b) a plurality of second repeat units each comprising at least one reactive species containing an organic, non-aromatic thiol molecule with a degree of thiol functionality.

Cyclo-octasulfur has the stoichiometry $S_8$ and is a ring of sulfur, as follows:

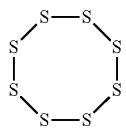

Elemental sulfur is normally in $S_8$ form. Upon ring opening, there may be an intermediate that is a linear chain of eight sulfur atoms (linear octasulfide), or a number of sulfur species containing 2, 3, 4, 5, 6, or 7 sulfur atoms that are bonded to each other in sulfur-sulfur bonds, —S—S—. Stated another way, ring opening of cyclo-octasulfur generally first creates linear or branched $S_n$, wherein n=2 to 8 or more, and wherein $S_n$ may be in neutral, anionic, or free-radical form.

As intended herein, sulfur atoms that are "derived from cyclo-octasulfur" means that cyclo-octasulfur is employed directly as a reactant to produce the polysulfide-based copolymer, or a prepolymer that is then reacted to form the copolymer. Impurities may be present in the starting cyclo-octasulfur, and those impurities may or may not end up in the final copolymer. Note that cyclo-octasulfur has a melting temperature of about 115° C.

In this disclosure, "thiol molecule" is synonymous with "thiol-containing molecule." That is, a thiol molecule contains at least one thiol (—SH) group. A thiol-containing molecule contains at least one thiol (—SH) group, which may be contained within one or more thiol portions of an overall molecule.

A first prepolymer may include a plurality of first repeat units each comprising at least two sulfur atoms bonded together via a sulfur-sulfur bond, wherein the sulfur atoms are derived from cyclo-octasulfur. A second prepolymer may include a plurality of second repeat units each comprising at least one reactive species containing an organic, non-aromatic thiol molecule with a degree of thiol functionality. The first prepolymer may be combined with a second prepolymer, to generate the polysulfide-based copolymer. Alternatively, or additionally, the first prepolymer may be reacted with thiol monomers or oligomers to generate the polysulfide-based copolymer. Alternatively, or additionally, the second prepolymer may be reacted with cyclo-octasulfur to generate the polysulfide-based copolymer.

The organic, non-aromatic thiol molecule may be selected from the group consisting of 1,2,4-tris(2-mercaptoethyl) cyclohexane, cyclopentanethiol, cyclohexanethiol, thiol-containing polyphosphazenes, and combinations thereof. FIG. 1 depicts exemplary chemical structures for organic, non-aromatic thiol molecules that may be employed, in some embodiments. In FIG. 1, structure (a) is cyclohexanethiol, structure (b) is cyclopentanethiol, structure (c) is 1,2,4-tris(2-mercaptoethyl)cyclohexane, and structure (d) is poly(dithiophosphazene), n=1-100, for example.

In some embodiments, the degree of thiol functionality is selected from 1 to 5, such as 1, 2, 3, 4, or 5. The organic, non-aromatic thiol molecule may be linear, cyclic, or branched, or a combination thereof.

In some embodiments, the organic, non-aromatic thiol molecule has a molecular weight of less than 5000 g/mol, such as about, or less than about, 4000 g/mol, 3000 g/mol, 2000 g/mol, 1500 g/mol, or 1000 g/mol.

In some embodiments, the polysulfide-based copolymer consists essentially of the plurality of first repeat units and the plurality of second repeat units.

The number of first repeat units may vary widely, such as from 1 to about 100. The number of second repeat units may vary widely, such as from 1 to about 100. The ratio of number of first repeat units to number of second repeat units may vary widely, such as from 0.01 to 100. The overall molecular weight of the polysulfide-based copolymer may vary widely, such as about $10^3$ g/mol, about $10^4$ g/mol, about $10^5$ g/mol, about $10^6$ g/mol, or greater.

The polysulfide-based copolymer may contain a wide range of total sulfur content. In various embodiments, the polysulfide-based copolymer has a total sulfur concentration of from about 0.1 wt % to about 50 wt %, or from about 1 wt % to about 50 wt %, or from about 5 wt % to about 50 wt %, or from about 0.1 wt % to about 20 wt %, or from about 0.1 wt % to about 10 wt %. The total sulfur concentration in the polysulfide-based copolymer may be about, at least about, or at most about 0.1, 0.2, 0.5, 1, 2, 3, 4, 5, 6, 7, 8, 9, 10, 15, 20, 25, 30, 35, 40, 45, or 50 wt %.

The ratio of sulfur atoms contained in the second repeat units (as thiol SH groups) to sulfur atoms contained in the first repeat units (in sulfur-sulfur bonds) may vary, such as from about 0.01 to about 100, or from about 0.05 to about 50, or from about 0.1 to about 20. In various embodiments, this sulfur-atom ratio is about, at least about, or at most about 0.01, 0.02, 0.05, 0.1, 0.2, 0.5, 1, 2, 5, 10, 20, 30, 40, 50, 75, or 100.

The polysulfide-based copolymer may be a linear copolymer, a block copolymer, an alternating copolymer, a segmented copolymer, a periodic copolymer, a statistical copolymer, a branched copolymer, a graft copolymer, a gradient copolymer, or a combination thereof, for example.

In some embodiments, the polysulfide-based copolymer further contains from about 1 ppm to about 1 wt % of an organometallic catalyst. The organometallic catalyst may contain a metal selected from the group consisting of tin, zinc, nickel, copper, sodium, silicon, and combinations thereof. For example, the organometallic catalyst may be selected from the group consisting of tetravinyl tin, tetraallyl tin, tetravinyl silane, tetraallyl silane, tributyl vinyl tin, allyltributyl tin, tetrabutyl tin, tetramethyl tin, tetraethyl tin, dibutyl tin dilaurate, zinc diethyldithiocarbamate, nickel diethyldithiocarbamate, copper diethyldithiocarbamate, sodium diethyldithiocarbamate trihydrate, zinc stearate, and combinations thereof. The incorporation of organometallic catalysts has been found to lower curing and reaction temperatures below 150° C.

In some embodiments, the polysulfide-based copolymer is characterized by at least 50% average, regular transmission of radiation at a wavelength selected from 100 nm to 12 µm, wherein the average, regular transmission is defined as the ratio (expressed as a percentage) of radiation intensity through a polysulfide-based copolymer thickness of 25 microns divided by incident radiation intensity. In various embodiments, the polysulfide-based copolymer is characterized by at least 50%, 55%, 60%, 65%, 70%, 75%, 80%, 85%, or 90% average, regular transmission of radiation at one or more wavelengths selected from 100 nm to 12 µm, or as an average over this entire range. In certain embodiments, the selected wavelengths are within the Vis and/or IR bands.

Other variations of the invention provide a polysulfide-based copolymer containing (a) a plurality of first repeat units each comprising at least two sulfur atoms bonded together via a sulfur-sulfur bond, wherein the sulfur atoms are derived from cyclo-octasulfur; and (b) a plurality of second repeat units each comprising at least one reactive species containing an organic, non-aromatic unsaturated molecule with a degree of unsaturation functionality, wherein the polysulfide-based copolymer has a total sulfur concentration of about 10 wt % or greater.

In some embodiments, the degree of unsaturation functionality is selected from 1 to 5, such as 1, 2, 3, 4, or 5. The organic, non-aromatic unsaturated molecule may be linear, cyclic, or branched.

Figure 2:
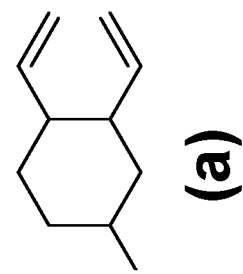
FIG. 2 depicts exemplary chemical structures for organic, non-aromatic unsaturated molecules that may be employed, in some embodiments; structure (a) is 1,2,4-trivinylcyclohexane, structure (b) is tetravinyl tin, structure (c) is norbornene, structure (d) is vinyl norbornene, and structure (e) is dicylopentadiene.
Figure 2:
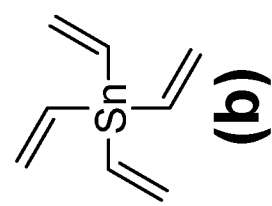
Figure 2:
Figure 2:
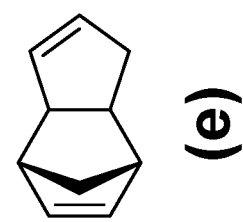

In some embodiments, the organic, non-aromatic unsaturated molecule is selected from the group consisting of 1,2,4-trivinylcyclohexane, norbornene, vinyl norbornene, dicyclopentadiene, $\alpha,\omega$-alkene-terminated hydrocarbons, $\alpha,\omega$-alkyne-terminated hydrocarbons, and combinations thereof. FIG. 2 depicts exemplary chemical structures for organic, non-aromatic unsaturated molecules that may be employed, in some embodiments. In FIG. 2, structure (a) is 1,2,4-trivinylcyclohexane, structure (b) is tetravinyl tin, structure (c) is norbornene, structure (d) is vinyl norbornene, and structure (e) is dicylopentadiene.

In some embodiments, the organic, non-aromatic unsaturated molecule does not contain a metal. In some embodiments, the organic, non-aromatic unsaturated molecule specifically does not contain tin (e.g., the organic, non-aromatic unsaturated molecule is not tetravinyl tin).

In some embodiments, the organic, non-aromatic unsaturated molecule has a molecular weight of less than 5000 g/mol, such as about, or less than about, 4000 g/mol, 3000 g/mol, 2000 g/mol, 1500 g/mol, or 1000 g/mol.

The number of first repeat units may vary widely, such as from 1 to about 100. The number of second repeat units may vary widely, such as from 1 to about 100. The ratio of number of first repeat units to number of second repeat units may vary widely, such as from 0.01 to 100. The overall molecular weight of the polysulfide-based copolymer may vary widely, such as about $10^3$ g/mol, about $10^4$ g/mol, about $10^5$ g/mol, about $10^6$ g/mol, or greater.

The polysulfide-based copolymer (containing unsaturated molecules) may contain a range of total sulfur content. In various embodiments, the polysulfide-based copolymer has a total sulfur concentration of from about 1 wt % to about 50 wt %, from about 5 wt % to about 30 wt %, or from about 10 wt % to about 20 wt %. The total sulfur concentration in the polysulfide-based copolymer may be about, at least about, or at most about 10, 15, 20, 25, 30, 35, 40, 45, or 50 wt %.

The polysulfide-based copolymer may be a linear copolymer, a block copolymer, an alternating copolymer, a segmented copolymer, a periodic copolymer, a statistical copolymer, a branched copolymer, a graft copolymer, a gradient copolymer, or a combination thereof, for example.

Optionally, the polysulfide-based copolymer further contains an organic, non-aromatic thiol molecule with a degree of thiol functionality (e.g., from 2 to 5). The thiol molecule may be contained in the same repeat units as the unsaturated molecule, or in different repeat units.

A first prepolymer may include a plurality of first repeat units each comprising at least two sulfur atoms bonded together via a sulfur-sulfur bond, wherein the sulfur atoms are derived from cyclo-octasulfur. A second prepolymer may include a plurality of second repeat units each comprising at least one reactive species containing an organic, non-aromatic unsaturated molecule with a degree of unsaturation functionality. The first prepolymer may be combined with a second prepolymer, to generate the polysulfide-based copolymer. Alternatively, or additionally, the first prepolymer may be reacted with unsaturated monomers or oligomers to generate the polysulfide-based copolymer. Alternatively, or additionally, the second prepolymer may be reacted with cyclo-octasulfur to generate the polysulfide-based copolymer.

The polysulfide-based copolymer may further contain from about 1 ppm to about 1 wt % of an organometallic catalyst. The organometallic catalyst may contain a metal selected from the group consisting of tin, zinc, nickel, copper, sodium, silicon, and combinations thereof. For example, the organometallic catalyst may be selected from the group consisting of tetravinyl tin, tetraallyl tin, tetravinyl silane, tetraallyl silane, tributyl vinyl tin, allyltributyl tin, tetrabutyl tin, tetramethyl tin, tetraethyl tin, dibutyl tin dilaurate, zinc diethyldithiocarbamate, nickel diethyldithiocarbamate, copper diethyldithiocarbamate, sodium diethyldithiocarbamate trihydrate, zinc stearate, and combinations thereof. The incorporation of organometallic catalysts has been found to lower curing and reaction temperatures below 150° C.

The polysulfide-based copolymer (with unsaturated molecules) may be characterized by at least 50% average, regular transmission of radiation at a wavelength selected from 100 nm to 12 µm, wherein the average, regular transmission is defined as the ratio (expressed as a percentage) of radiation intensity through a polysulfide-based copolymer thickness of 25 microns divided by incident radiation intensity. In various embodiments, the polysulfide-based copolymer is characterized by at least 50%, 55%, 60%, 65%, 70%, 75%, 80%, 85%, or 90% average, regular transmission of radiation at one or more wavelengths selected from 100 nm to 12 µm, or as an average over this entire range. In certain embodiments, the selected wavelengths are within the Vis and/or IR bands.

Still other variations of the invention provide a polysulfide-based copolymer containing (a) a plurality of first repeat units each comprising at least two sulfur atoms bonded together via a sulfur-sulfur bond, wherein the sulfur atoms are derived from cyclo-octasulfur; (b) a plurality of second repeat units each comprising at least one reactive species containing an organic, non-aromatic thiol molecule with a degree of thiol functionality; and (c) a plurality of third repeat units each comprising at least one reactive species containing an organic, non-aromatic unsaturated molecule with a degree of unsaturation functionality.

In some embodiments, the organic, non-aromatic thiol molecule has a molecular weight of less than 5000 g/mol, and the organic, non-aromatic unsaturated molecule also has a molecular weight of less than 5000 g/mol.

The number of first repeat units may vary widely, such as from 1 to about 100. The number of second repeat units may vary widely, such as from 1 to about 100. The number of third repeat units may vary widely, such as from 1 to about 100. The ratio of number of first repeat units to number of second repeat units may vary widely, such as from 0.01 to 100. The ratio of number of first repeat units to number of third repeat units may vary widely, such as from 0.01 to 100. The overall molecular weight of the polysulfide-based copolymer may vary widely, such as about $10^3$ g/mol, about $10^4$ g/mol, about $10^5$ g/mol, about $10^6$ g/mol, or greater.

The polysulfide-based copolymer may contain a wide range of total sulfur content. In various embodiments, the polysulfide-based copolymer has a total sulfur concentration of from about 0.1 wt % to about 50 wt %, or from about 1 wt % to about 50 wt %, or from about 5 wt % to about 50 wt %, or from about 0.1 wt % to about 20 wt %, or from about 0.1 wt % to about 10 wt %. The total sulfur concentration in the polysulfide-based copolymer may be about, at least about, or at most about 0.1, 0.2, 0.5, 1, 2, 3, 4, 5, 6, 7, 8, 9, 10, 15, 20, 25, 30, 35, 40, 45, 50 wt %. The polysulfide-based copolymer has a total sulfur concentration of about 1 wt % or greater, in some embodiments. The polysulfide-based copolymer has a total sulfur concentration of about 10 wt % or greater, in certain embodiments.

The ratio of sulfur atoms contained in the second repeat units (as thiol SH groups) to sulfur atoms contained in the first repeat units (in sulfur-sulfur bonds) may vary, such as from about 0.01 to about 100, or from about 0.05 to about 50, or from about 0.1 to about 20. In various embodiments, this sulfur-atom ratio is about, at least about, or at most about 0.01, 0.02, 0.05, 0.1, 0.2, 0.5, 1, 2, 5, 10, 20, 30, 40, 50, 75, or 100.

The polysulfide-based copolymer may be a linear copolymer, a block copolymer, an alternating copolymer, a segmented copolymer, a periodic copolymer, a statistical copolymer, a branched copolymer, a graft copolymer, a gradient copolymer, or a combination thereof, for example.

In some embodiments, the degree of thiol functionality is selected from 1 to 5, i.e. 1, 2, 3, 4, or 5, and the degree of unsaturation functionality is also (independently) selected from 1 to 5, i.e. 1, 2, 3, 4, or 5.

In the polysulfide-based copolymer with both thiol and ene units, the organic, non-aromatic thiol molecule may be selected from the group consisting of 1,2,4-tris(2-mercaptoethyl)cyclohexane, cyclopentanethiol, cyclohexanethiol, thiol-containing polyphosphazene, and combinations thereof; and the organic, non-aromatic unsaturated molecule may be selected from the group consisting of 1,2,4-trivinyl-cyclohexane, norbornene, vinyl norbornene, dicyclopentadiene, $\alpha,\omega$-alkene-terminated hydrocarbons, $\alpha,\omega$-alkyne-terminated hydrocarbons, and combinations thereof.

In some embodiments, the second and third repeat units are combined such that in at least portions of the polymer, there is a combined repeat unit containing both thiol and ene. The combined repeat unit may contain thiol and ene, or a reacted variant thereof, such as thioether. Along with the first repeat unit that contains a sulfur-sulfur bond, there may be non-combined second repeat units and/or non-combined third repeat units, in addition to the combined repeat units. The second repeat units and/or third repeat units may be intentionally present or may be unreacted portions of the polymer, defects with only thiol or only ene, and so on.

A first prepolymer may include a plurality of first repeat units each comprising at least two sulfur atoms bonded together via a sulfur-sulfur bond, wherein the sulfur atoms are derived from cyclo-octasulfur. A second prepolymer may include a plurality of second repeat units each comprising at least one reactive species containing an organic, non-aromatic thiol molecule with a degree of thiol functionality. A third prepolymer may include a plurality of third repeat units each comprising at least one reactive species containing an organic, non-aromatic unsaturated molecule with a degree of unsaturation functionality. The first prepolymer, second prepolymer, and third prepolymer may be combined to generate the polysulfide-based copolymer. Alternatively, or additionally, the first prepolymer may be reacted with thiol monomers or oligomers and/or with unsaturated monomers or oligomers to generate the polysulfide-based copolymer. Alternatively, or additionally, the second and third prepolymers may be reacted with cyclo-octasulfur to generate the polysulfide-based copolymer.

In some embodiments, the polysulfide-based copolymer (with both thiol and ene units) further contains from about 1 ppm to about 1 wt % of an organometallic catalyst that contains a metal selected from the group consisting of tin, zinc, nickel, copper, sodium, silicon, and combinations thereof. For example, the organometallic catalyst may be selected from the group consisting of tetravinyl tin, tetraallyl tin, tetravinyl silane, tetraallyl silane, tributyl vinyl tin, allyltributyl tin, tetrabutyl tin, tetramethyl tin, tetraethyl tin, dibutyl tin dilaurate, zinc diethyldithiocarbamate, nickel diethyldithiocarbamate, copper diethyldithiocarbamate, sodium diethyldithiocarbamate trihydrate, zinc stearate, and combinations thereof. The incorporation of organometallic catalysts has been found to lower curing and reaction temperatures below 150° C.

The polysulfide-based copolymer (with both thiol molecules and unsaturated molecules) may be characterized by at least 50% average, regular transmission of radiation at a wavelength selected from 100 nm to 12 μm, wherein the average, regular transmission is defined as the ratio (expressed as a percentage) of radiation intensity through a polysulfide-based copolymer thickness of 25 microns divided by incident radiation intensity. In various embodiments, the polysulfide-based copolymer is characterized by at least 50%, 55%, 60%, 65%, 70%, 75%, 80%, 85%, or 90% average, regular transmission of radiation at one or more wavelengths selected from 100 nm to 12 μm, or as an average over this entire range. In certain embodiments, the selected wavelengths are within the Vis and/or IR bands.

Yet other variations of the invention provide a polysulfide-based copolymer containing (a) a plurality of first repeat units each comprising at least two sulfur atoms bonded together via a sulfur-sulfur bond, wherein the sulfur atoms are derived from cyclo-octasulfur; and (b) a plurality of second repeat units each comprising at least one reactive species containing an organic, non-aromatic thioether molecule.

In some embodiments, the organic, non-aromatic thioether molecule has a molecular weight of less than 5000 g/mol, such as about, or less than about, 4000 g/mol, 3000 g/mol, 2000 g/mol, 1500 g/mol, or 1000 g/mol. The organic, non-aromatic thioether molecule may be derived from a reaction between an organic, non-aromatic thiol molecule and an organic, non-aromatic unsaturated molecule.

The number of first repeat units may vary widely, such as from 1 to about 100. The number of second repeat units may vary widely, such as from 1 to about 100. The ratio of number of first repeat units to number of second repeat units may vary widely, such as from 0.01 to 100. The overall molecular weight of the polysulfide-based copolymer may vary widely, such as about $10^3$ g/mol, about $10^4$ g/mol, about $10^5$ g/mol, about $10^6$ g/mol, or greater.

The polysulfide-based copolymer may contain a wide range of total sulfur content. In various embodiments, the polysulfide-based copolymer has a total sulfur concentration of from about 0.1 wt % to about 50 wt %, or from about 1 wt % to about 50 wt %, or from about 5 wt % to about 50 wt %, or from about 0.1 wt % to about 20 wt %, or from about 0.1 wt % to about 10 wt %. The total sulfur concentration in the polysulfide-based copolymer may be about, at least about, or at most about 0.1, 0.2, 0.5, 1, 2, 3, 4, 5, 6, 7, 8, 9, 10, 15, 20, 25, 30, 35, 40, 45, or 50 wt %.

The ratio of sulfur atoms contained in the second repeat units (in thioether groups) to sulfur atoms contained in the first repeat units (in sulfur-sulfur bonds) may vary, such as from about 0.01 to about 100, or from about 0.05 to about 50, or from about 0.1 to about 20. In various embodiments, this sulfur-atom ratio is about, at least about, or at most about 0.01, 0.02, 0.05, 0.1, 0.2, 0.5, 1, 2, 5, 10, 20, 30, 40, 50, 75, or 100.

The polysulfide-based copolymer may be a linear copolymer, a block copolymer, an alternating copolymer, a segmented copolymer, a periodic copolymer, a statistical copolymer, a branched copolymer, a graft copolymer, a gradient copolymer, or a combination thereof, for example.

In the final copolymer, there may be thioether molecules, thiol molecules, and unsaturated molecules all present. For example, in some embodiments, terminal thiols and enes are not all reacted away to create thioethers. An example of this scenario is a method employing a skewed (non-stoichiometric) ratio to make a viscous, non-cured polymer, such as prepolymer during polymer synthesis.

A first prepolymer may include a plurality of first repeat units each comprising at least two sulfur atoms bonded together via a sulfur-sulfur bond, wherein the sulfur atoms are derived from cyclo-octasulfur. A second prepolymer may include a plurality of second repeat units each comprising at least one reactive species containing an organic, non-aromatic thioether molecule. The first prepolymer may be combined with a second prepolymer, to generate the polysulfide-based copolymer. Alternatively, or additionally, the first prepolymer may be reacted with thioether monomers or oligomers to generate the polysulfide-based copolymer. Alternatively, or additionally, the second prepolymer may be reacted with cyclo-octasulfur to generate the polysulfide-based copolymer.

In some embodiments of a second prepolymer, there is a plurality of repeat units comprising at least one reactive species containing an organic, non-aromatic thioether molecule that is terminated by reactive thiols and/or by reactive unsaturated groups. The second prepolymer may be combined with a first prepolymer that includes a plurality of first repeat units each comprising at least two sulfur atoms bonded together via a sulfur-sulfur bond.

In some embodiments, the polysulfide-based copolymer (containing thioether molecules) further contains from about 1 ppm to about 1 wt % of an organometallic catalyst that contains a metal selected from the group consisting of tin, zinc, nickel, copper, sodium, silicon, and combinations thereof. The organometallic catalyst may be selected from the group consisting of tetravinyl tin, tetraallyl tin, tetravinyl silane, tetraallyl silane, tributyl vinyl tin, allyltributyl tin, tetrabutyl tin, tetramethyl tin, tetraethyl tin, dibutyl tin dilaurate, zinc diethyldithiocarbamate, nickel diethyldithiocarbamate, copper diethyldithiocarbamate, sodium diethyldithiocarbamate trihydrate, zinc stearate, and combinations thereof. The incorporation of organometallic catalysts has been found to lower curing and reaction temperatures below 150° C.

In some embodiments, the polysulfide-based copolymer (containing thioether molecules) is characterized by at least 50% average, regular transmission of radiation at a wavelength selected from 100 nm to 12 µm, wherein the average, regular transmission is defined as the ratio (expressed as a percentage) of radiation intensity through a polysulfide-based copolymer thickness of 25 microns divided by incident radiation intensity. In various embodiments, the polysulfide-based copolymer is characterized by at least 50%, 55%, 60%, 65%, 70%, 75%, 80%, 85%, or 90% average, regular transmission of radiation at one or more wavelengths selected from 100 nm to 12 µm, or as an average over this entire range. In certain embodiments, the selected wavelengths are within the Vis and/or IR bands.

As explained above, some embodiments utilize the generation of one or more prepolymers during synthesis of the copolymer. The prepolymers may themselves be synthesized, or the prepolymers may be obtained from an external source. When the prepolymers are combined, additional polymerization may be carried out, to increase overall molecular weight, and/or curing may be conducted to crosslink the copolymer network. In some embodiments producing block copolymers, polymers of desired molecular weight are combined and cured to form the copolymer, without additional increase of molecular weight.

Some embodiments utilize an addition to a prepolymer of oxidizing agents (such as $MnO_2$) to oxidize an excess of free —SH end groups, thereby generating S—S bonds. The generation of additional S—S bonds, resulting in network curing, provides a practical cure technique.

In some embodiments, the polysulfide-based copolymer does not contain diisopropenyl benzene or a reacted form thereof. In some embodiments, the repeat units of the polysulfide-based copolymer do not contain aromatic compounds, such as styrene. There may be aromatic catalysts present in the composition. In some embodiments, the polysulfide-based copolymer does not contain amines or a reacted form thereof. In some embodiments, the polysulfide-based copolymer does not contain urethanes, thiourethanes, or a reacted form thereof. In some embodiments, the polysulfide-based copolymer does not contain isocyanates or a reacted form thereof. In some embodiments, the polysulfide-based copolymer does not contain epithio groups. In certain embodiments, the polysulfide-based copolymer does not contain 2,5-bis(mercaptomethyl)-1,4-dithiane; 1,2,3-trimercapto-propane; bis(mercaptoethyl)sulfide; bis(mercaptoethyl)disulfide; 1,2-bis(mercaptoethylthio)-3-mercaptopropane; or a reacted form thereof. In certain embodiments, the polysulfide-based copolymer does not contain germanium or selenium, when the polysulfide-based copolymer contains more than 50 wt % total sulfur.

In some embodiments, the polysulfide-based copolymer is vitrified or reaches vitrification. "Vitrification" is defined as the point at which the molecular weight or crosslink density of the curing polymer exceeds that which is thermodynamically stable as a rubber, and the material undergoes a transition from a rubber to a glass—at which point the reaction dramatically slows due to the reduced mobility of the reactants. The vitrification point can be measured using differential scanning calorimetry (DSC), temperature-modulated differential scanning calorimetry (TMDSC), and/or dynamic mechanical analysis (DMA).

Depending on the choice of starting monomers, and to some extent the degree of polymerization, the polysulfide-based copolymer may have a range of densities. In various embodiments, the polysulfide-based copolymer has a density from about 1 g/cm³ to about 2 g/cm³, such as about 1.2, 1.3, 1.4, 1.5, 1.6, 1.7, 1.8, or 1.9 g/cm³, measured at 25° C.

Depending on the choice of starting monomers, and to some extent the degree of polymerization, the polysulfide-based copolymer may have a range of index of refraction. In various embodiments, the polysulfide-based copolymer has a normal index of refraction from about 1 to about 2, such as about 1.3, 1.4, 1.5, 1.6, 1.7, 1.8, or 1.9, measured at 25° C.

In some embodiments, the polysulfide-based copolymer is characterized by a work of fracture of at least 75 J/m² and/or a Knoop hardness of at least 50 MPa. The "work of fracture" characterizes the toughness of the polymer and is the energy required to propagate a crack in the polymer. The work of fracture may be measured using an Instron tensile-testing machine, for example. See Smith III et al., "Estimation of fracture energy from the work of fracture and fracture surface area: I. Stable crack growth" *Int J Fract* (2009) 156:97-102, which is hereby incorporated by reference herein for its teachings of measuring the work of fracture.

Knoop hardness is a well-known measurement. Knoop hardness is calculated by measuring the indentation produced by a diamond tip that is pressed onto the surface of a sample. See Knoop et al., "A Sensitive Pyramidal-Diamond Tool for Indentation Measurements" *Journal of Research of the National Bureau of Standards*(1939) 23 (1): 39-61 (Research Paper RP1220), which is hereby incorporated by reference herein for its teachings of measuring the Knoop hardness.

In various embodiments, the polysulfide-based copolymer is characterized by a work of fracture of at least 10, 25, 50, 75, or 100 J/m$^2$. In these or other embodiments, the polysulfide-based copolymer is characterized by a Knoop hardness of at least 10, 25, 50, 100, 200, 300, or 400 MPa. In some embodiments, the polysulfide-based copolymer is characterized by a Knoop hardness less than 500 MPa or less than 1000 MPa.

In some embodiments, the infrared-transparent polymer further includes one or more filler particles physically blended with the polysulfide-based copolymer. The concentration of filler particles may vary, such as from about 0.1 wt % to about 50 wt % on the basis of the overall composition (polysulfide-based copolymer+filler particles).

Filler particles for use in the compositions of the present disclosure preferably exhibit high transparency and small particle size relative to incident radiation wavelength in order to increase transparency and limit scattering. For example, the filler particles material may be chosen so as to be transparent in the MWIR and/or LWIR bands. However, the present invention is not limited to filler particles (when present) that are transparent in the MWIR and/or LWIR bands. If the concentration of filler particles is relatively low (e.g., less than about 10 wt %, 5 wt %, or 1 wt %), the filler particles may lack transparency, while the overall material may have acceptable transparency.

Suitable filler particles include, but are not limited to, germanium, $CaF_2$, NaCl, KCl, KBr, diamond, Si, CsI, MgO, $MgF_2$, LiF, NaF, $BaF_2$, ZnS, ZnSe, PbS, PbSe, $PbF_2$, $LiYF_4$, $NaYF_4$, ThBrI, ThBrCl, and combinations thereof.

Filler particles, when used in the compositions of the present disclosure, may be selected in the nanoparticle size range. In some embodiments, the filler particles have an average discrete particle size ranging from about 10 nm to about 1000 nm, such as from about 100 nm to about 500 nm.

Particles sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

EXAMPLES

Example 1: TVC+TMC with 8.2 wt % S at 120° C.

To a 20-mL vial equipped with a stir bar, powdered sulfur ($S_8$ 0.592 g, 2.31 mmol with respect to thiol-ene reactive pair), 1,2,4-trivinylcyclohexane (TVC) (2.5 g, 15.406 mmol), and 1,2,4-tris(mercaptoethyl)cyclohexane (TMC) (4.068 g, 15.406 mmol) are combined. The vial is sealed with a rubber septum and purged with nitrogen for 2 minutes. The vial is placed in a thermostated oil bath at 120° C. and stirred at 200 rpm while the solid sulfur melts and forms a homogenous yellow mixture. The mixture is allowed to stir until an increase in viscosity prevents stirring. The contents are placed into a silicon or glass mold and allowed to cure at 120° C. until vitrified.

Figure 3:
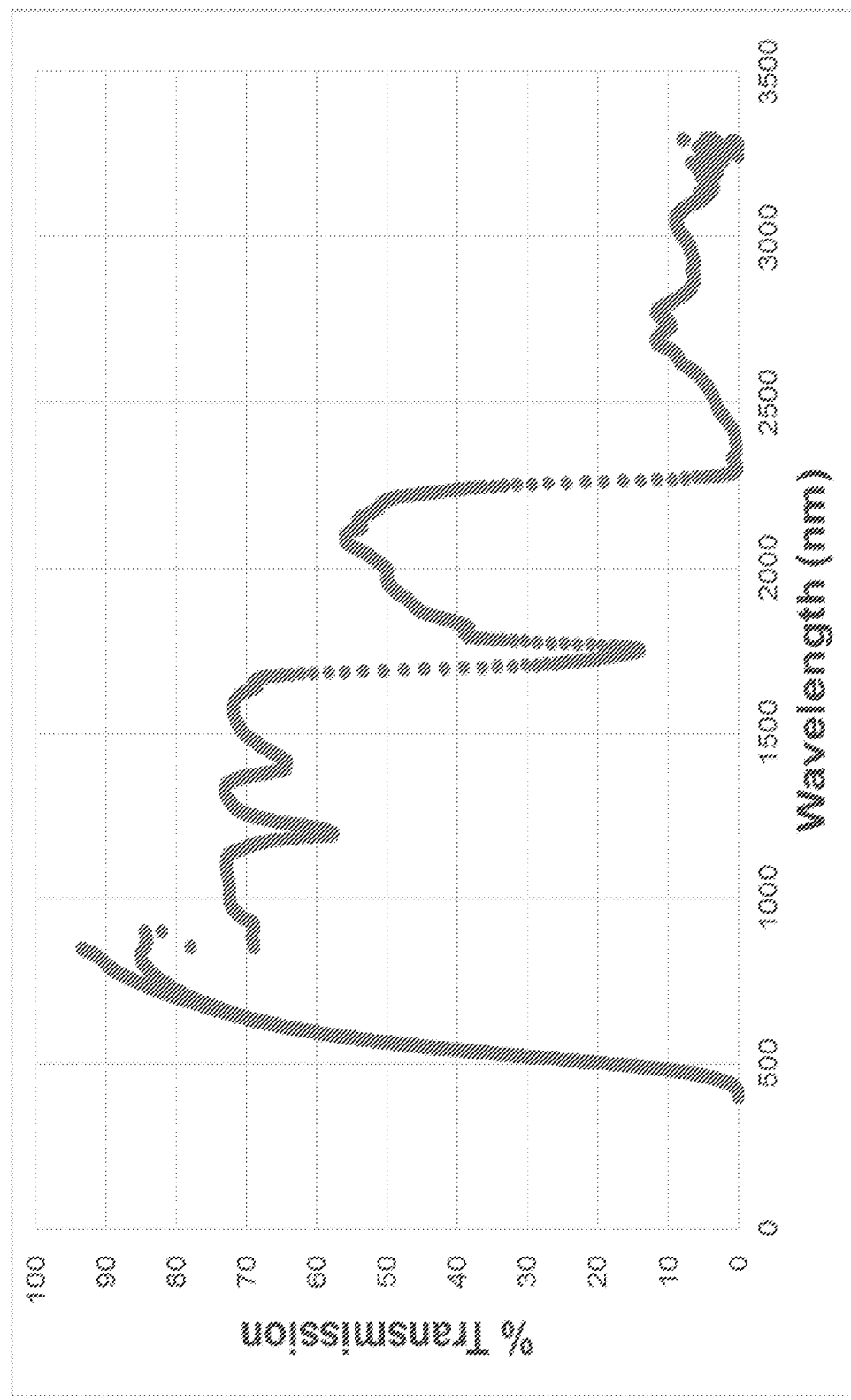
FIG. 3 shows transmission spectra of a ~1-millimeter-thick cured film from Example 1, with two replicate scans in the visible spectrum of 400-800 nm and one scan in the near-IR spectrum of 800-3300 nm.

FIG. 3 shows transmission spectra of a ~1-millimeter-thick cured film from this Example 1, with two replicate scans in the visible spectrum of 400-800 nm and one scan in the near-IR spectrum of 800-3300 nm. A scan is not made in the UV spectrum, but due to the sharply rising transmission peak around 400 nm, the film is probably not significantly UV-transparent.

Example 2: DCPD with 43.6 wt % S at 140° C.

To a 20-mL vial equipped with a stir bar, powdered sulfur ($S_8$, 0.774 g, 3.023 mmol) and dicyclopentadiene (DCPD) (1.00 g, 7.564 mmol) are combined. The vial is sealed with a rubber septum and purged with nitrogen for 2 minutes. The vial is placed in a thermostated oil bath at 140° C. and stirred at 200 rpm while the solid sulfur melts and forms a homogenous yellow mixture. Quickly the mixture becomes a deep cherry red solution as the viscosity increases. The contents are poured into a silicon or glass mold and allowed to cure at 140° C. until vitrified.

Example 3: DCPD+TMC with 5.5 wt % S at 140° C.

In a procedure similar to Example 2, powdered sulfur ($S_8$, 0.097 g, 0.378 mmol), DCPD (1.00 g, 7.56 mmol), and TMC (0.665, 0.756 mmol) are combined. The mixture is placed in a 140° C. thermostated oil bath until a viscous reddish-black solution forms. The contents are poured into a silicon or glass mold and allowed to cure at 140° C. until vitrified.

Example 4: DCPD+TMC with 10.4 wt % S at 140° C.

In a procedure similar to Example 2, powdered sulfur ($S_8$, 0.194 g, 0.758 mmol), DCPD (1.00 g, 7.56 mmol), and TMC (0.665, 0.756 mmol) are combined. The mixture is placed in a 140° C. thermostated oil bath until a viscous reddish-black solution forms. The contents are poured into a silicon or glass mold and allowed to cure at 140° C. until vitrified.

Example 5: DCPD+TMC with 18.9 wt % S at 140° C.

In a procedure similar to Example 2, powdered sulfur ($S_8$, 0.388 g, 1.516 mmol), DCPD (1.00 g, 7.56 mmol), and TMC (0.665, 0.756 mmol) are combined. The mixture is placed in a 140° C. thermostated oil bath until a viscous reddish-black solution forms. The contents are poured into a silicon or glass mold and allowed to cure at 140° C. until vitrified.

Example 6: VNB with 46 wt % S at 140° C.

In a procedure similar to Example 2, powdered sulfur ($S_8$, 0.852 g, 3.328 mmol) and 5-vinyl-2-norbornene (VNB) (1.00 g, 8.32 mmol) are combined. The mixture is placed in a 140° C. thermostated oil bath until a viscous reddish-black solution forms. The contents are poured into a silicon or glass mold and allowed to cure at 140° C. until vitrified.

Example 7: VNB+TMC with 5.8 wt % S at 140° C.

In a procedure similar to Example 2, powdered sulfur ($S_8$, 0.213 g, 0.832 mmol), VNB (2.00 g, 16.639 mmol), and TMC (1.464 g, 5.546 mmol) are combined. The mixture is placed in a 140° C. thermostated oil bath until a viscous reddish-black solution forms. The contents are poured into a silicon or glass mold and allowed to cure at 140° C. until vitrified.

Example 8: VNB+TMC with 5.8 wt % S at 140° C.

In a procedure similar to Example 2, powdered sulfur ($S_8$, 0.852 g, 3.328 mmol), VNB (2.00 g, 16.639 mmol), and TMC (1.464 g, 5.546 mmol) are combined. The mixture is placed in a 140° C. thermostated oil bath until a viscous reddish-black solution forms. The contents are poured into a silicon or glass mold and allowed to cure at 140° C. until vitrified.

Example 9: Diallyl Sulfide+TMC with 8.2 wt % S at 100° C.

To a 20-mL vial equipped with a stir bar, powdered sulfur ($S_8$, 0.149 g, 0.58 mmol), diallyl sulfide (0.66 g, 5.81 mmol), and 1,2,4-tris(mercaptoethyl)cyclohexane (TMC) (1 g, 3.78 mmol) are combined to create a mixture that is stoichiometrically equivalent in unsaturated and thiol functional groups. Finally 1 phr (≈17 mg) tetravinyl tin catalyst is added. The vial is sealed with a rubber septum and purged with nitrogen for 2 minutes. The vial is placed in a thermostated oil bath at 100° C. and forms a homogenous light yellow liquid that noticeably thickens over 5-6 hr and solidifies (cures) for 16 hr overnight.

Example 10: TVC+TMC with 0.9 wt % S at 100° C. with 1 phr Tetravinyl Tin

To a 20-mL vial equipped with a stir bar, powdered sulfur ($S_8$, 47.3 mg, 0.185 mmol), trivinylcyclohexane (TVC) (2.00 g, 12.34 mmol), and 1,2,4-tris(mercaptoethyl)cyclohexane (TMC) (3.18 g, 12.34 mmol) are combined to create a mixture that is stoichiometrically equivalent in unsaturated and thiol functional groups. Finally 1 phr (51.8 mg) tetravinyl tin catalyst is added. The vial is sealed with a rubber septum and purged with nitrogen for 2 minutes. The vial is placed in a thermostated oil bath at 100° C. for 30 min and forms a homogenous light yellow liquid. This liquid is then poured between two glass plates with mold release separated by a 1-mm-thick spacer shim and introduced to a 100° C. oven. The film cures overnight and is released as a solid, light-yellow, free-standing film.

Comparative Example

To a 20-mL vial equipped with a stir bar, powdered sulfur ($S_8$, 4.000 g, 15.625 mmol) is added and reacted at 185° C. until a viscous orange polysulfur forms. 1,3-diisopropenylbenzene (DIB) (1.000 g, 6.320 mmol) is added and stirred until the mixture homogenizes. The contents are poured into a preheated silicon mold at 185° C. and placed into a 185° C. oven until vitrified. The vitrified material is then cured at 100° C. for 16 hours. The system readily depolymerizes when at 185° C. for a long period of time; thus, it is difficult to control the gelation, compared to Examples 1-10 herein.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A polysulfide-based copolymer containing (a) a plurality of first repeat units each comprising at least two sulfur atoms bonded together via a sulfur-sulfur bond; and (b) a plurality of second repeat units each comprising at least one reactive species containing an organic, non-aromatic thiol molecule with a degree of thiol functionality, wherein said organic, non-aromatic thiol molecule is selected from the group consisting of 1,2,4-tris(2-mercaptoethyl)cyclohexane, cyclopentanethiol, cyclohexanethiol, thiol-containing polyphosphazene, and combinations thereof.

2. The polysulfide-based copolymer of claim 1, wherein said degree of thiol functionality is selected from 1 to 5.

3. The polysulfide-based copolymer of claim 1, wherein said organic, non-aromatic thiol molecule has a molecular weight of less than 5000 g/mol.

4. The polysulfide-based copolymer of claim 1, wherein said polysulfide-based copolymer further contains from about 1 ppm to about 1 wt % of an organometallic catalyst based on total weight of said polysulfide-based copolymer and said organometallic catalyst.

5. The polysulfide-based copolymer of claim 4, wherein said organometallic catalyst contains a metal selected from the group consisting of tin, zinc, nickel, copper, sodium, silicon, and combinations thereof.

6. The polysulfide-based copolymer of claim 5, wherein said organometallic catalyst is selected from the group consisting of tetravinyl tin, tetraallyl tin, tetravinyl silane, tetraallyl silane, tributyl vinyl tin, allyltributyl tin, tetrabutyl tin, tetramethyl tin, tetraethyl tin, dibutyl tin dilaurate, zinc diethyldithiocarbamate, nickel diethyldithiocarbamate, copper diethyldithiocarbamate, sodium diethyldithiocarbamate trihydrate, zinc stearate, and combinations thereof.

7. The polysulfide-based copolymer of claim 1, wherein said polysulfide-based copolymer is characterized by at least 50% average, regular transmission of radiation at a wavelength selected from 100 nm to 12 μm, wherein said average, regular transmission is defined as the ratio (expressed as a percentage) of radiation intensity through a polysulfide-based copolymer thickness of 25 microns divided by incident radiation intensity.

8. A polysulfide-based copolymer containing (a) a plurality of first repeat units each comprising at least two sulfur atoms bonded together via a sulfur-sulfur bond; and (b) a plurality of second repeat units each comprising at least one reactive species containing an organic, non-aromatic unsaturated molecule with a degree of unsaturation functionality; and (c) a plurality of third repeat units each comprising at least one reactive species containing an organic, non-aromatic thiol molecule with a degree of thiol functionality, wherein said organic, non-aromatic thiol molecule is selected from the group consisting of 1,2,4-tris(2-mercaptoethyl)cyclohexane, cyclopentanethiol, cyclohexanethiol, thiol-containing polyphosphazene, and combinations thereof, wherein said polysulfide-based copolymer has a total sulfur concentration of about 10 wt % or greater.

9. The polysulfide-based copolymer of claim 8, wherein said degree of unsaturation functionality is selected from 1 to 5.

10. The polysulfide-based copolymer of claim 8, wherein said organic, non-aromatic unsaturated molecule is selected from the group consisting of 1,2,4-trivinylcyclohexane, norbornene, vinyl norbornene, dicyclopentadiene, $\alpha,\omega$-alkene-terminated hydrocarbons, $\alpha,\omega$-alkyne-terminated hydrocarbons, and combinations thereof.

11. The polysulfide-based copolymer of claim 8, wherein said organic, non-aromatic unsaturated molecule has a molecular weight of less than 5000 g/mol.

12. The polysulfide-based copolymer of claim 8, wherein said polysulfide-based copolymer further contains an organic, non-aromatic thiol molecule with a degree of thiol functionality.

13. The polysulfide-based copolymer of claim 8, wherein said polysulfide-based copolymer further contains from about 1 ppm to about 1 wt % of an organometallic catalyst.

14. The polysulfide-based copolymer of claim 13, wherein said organometallic catalyst contains a metal selected from the group consisting of tin, zinc, nickel, copper, sodium, silicon, and combinations thereof.

15. The polysulfide-based copolymer of claim 14, wherein said organometallic catalyst is selected from the group consisting of tetravinyl tin, tetraallyl tin, tetravinyl silane, tetraallyl silane, tributyl vinyl tin, allyltributyl tin, tetrabutyl tin, tetramethyl tin, tetraethyl tin, dibutyl tin dilaurate, zinc diethyldithiocarbamate, nickel diethyldithiocarbamate, copper diethyldithiocarbamate, sodium diethyldithiocarbamate trihydrate, zinc stearate, and combinations thereof.

16. The polysulfide-based copolymer of claim 8, wherein said polysulfide-based copolymer is characterized by at least 50% average, regular transmission of radiation at a wavelength selected from 100 nm to 12 μm, wherein said average, regular transmission is defined as the ratio (expressed as a percentage) of radiation intensity through a polysulfide-based copolymer thickness of 25 microns divided by incident radiation intensity.

17. A polysulfide-based copolymer containing (a) a plurality of first repeat units each comprising at least two sulfur atoms bonded together via a sulfur-sulfur bond; (b) a plurality of second repeat units each comprising at least one reactive species containing an organic, non-aromatic thiol molecule with a degree of thiol functionality; and (c) a plurality of third repeat units each comprising at least one reactive species containing an organic, non-aromatic unsaturated molecule with a degree of unsaturation functionality, wherein said organic, non-aromatic thiol molecule is selected from the group consisting of 1,2,4-tris(2-mercaptoethyl)cyclohexane, cyclopentanethiol, cyclohexanethiol, thiol-containing polyphosphazene, and combinations thereof.

18. The polysulfide-based copolymer of claim 17, wherein said organic, non-aromatic thiol molecule has a molecular weight of less than 5000 g/mol, and wherein said organic, non-aromatic unsaturated molecule has a molecular weight of less than 5000 g/mol.

19. The polysulfide-based copolymer of claim 17, wherein said degree of thiol functionality is selected from 1 to 5, and wherein said degree of unsaturation functionality is selected from 1 to 5.

20. The polysulfide-based copolymer of claim 17, wherein said polysulfide-based copolymer has a total sulfur concentration of about 10 wt % or greater.

21. The polysulfide-based copolymer of claim 17, wherein said organic, non-aromatic unsaturated molecule is selected from the group consisting of 1,2,4-trivinylcyclohexane, norbornene, vinyl norbornene, dicyclopentadiene, $\alpha,\omega$-alkene-terminated hydrocarbons, $\alpha,\omega$-$\alpha,\omega$-alkyne-terminated hydrocarbons, and combinations thereof.

22. The polysulfide-based copolymer of claim 17, wherein said polysulfide-based copolymer further contains from about 1 ppm to about 1 wt % of an organometallic catalyst that contains a metal selected from the group consisting of tin, zinc, nickel, copper, sodium, silicon, and combinations thereof.

23. The polysulfide-based copolymer of claim 22, wherein said organometallic catalyst is selected from the group consisting of tetravinyl tin, tetraallyl tin, tetravinyl silane, tetraallyl silane, tributyl vinyl tin, allyltributyl tin, tetrabutyl tin, tetramethyl tin, tetraethyl tin, dibutyl tin dilaurate, zinc diethyldithiocarbamate, nickel diethyldithiocarbamate, copper diethyldithiocarbamate, sodium diethyldithiocarbamate trihydrate, zinc stearate, and combinations thereof.

24. The polysulfide-based copolymer of claim 17, wherein said polysulfide-based copolymer is characterized by at least 50% average, regular transmission of radiation at a wavelength selected from 100 nm to 12 μm, wherein said average, regular transmission is defined as the ratio (expressed as a percentage) of radiation intensity through a polysulfide-based copolymer thickness of 25 microns divided by incident radiation intensity.

25. A polysulfide-based copolymer containing (a) a plurality of first repeat units each comprising at least two sulfur atoms bonded together via a sulfur-sulfur bond; (b) a plurality of second repeat units each comprising at least one reactive species containing an organic, non-aromatic thioether molecule; and (c) a plurality of third repeat units each comprising at least one reactive species containing an organic, non-aromatic thiol molecule with a degree of thiol functionality, wherein said organic, non-aromatic thiol molecule is selected from the group consisting of 1,2,4-tris(2-mercaptoethyl)cyclohexane, cyclopentanethiol, cyclohexanethiol, thiol-containing polyphosphazene, and combinations thereof.

26. The polysulfide-based copolymer of claim 25, wherein said organic, non-aromatic thioether molecule has a molecular weight of less than 5000 g/mol.

27. The polysulfide-based copolymer of claim 25, wherein said polysulfide-based copolymer further contains from about 1 ppm to about 1 wt % of an organometallic catalyst that contains a metal selected from the group consisting of tin, zinc, nickel, copper, sodium, silicon, and combinations thereof.

28. The polysulfide-based copolymer of claim 27, wherein said organometallic catalyst is selected from the group consisting of tetravinyl tin, tetraallyl tin, tetravinyl silane, tetraallyl silane, tributyl vinyl tin, allyltributyl tin, tetrabutyl tin, tetramethyl tin, tetraethyl tin, dibutyl tin dilaurate, zinc diethyldithiocarbamate, nickel diethyldithiocarbamate, copper diethyldithiocarbamate, sodium diethyldithiocarbamate trihydrate, zinc stearate, and combinations thereof.

29. The polysulfide-based copolymer of claim 25, wherein said polysulfide-based copolymer is characterized by at least 50% average, regular transmission of radiation at a wavelength selected from 100 nm to 12 μm, wherein said average, regular transmission is defined as the ratio (expressed as a percentage) of radiation intensity through a polysulfide-based copolymer thickness of 25 microns divided by incident radiation intensity.

\* \* \* \* \*